INVENTOR.
Salvador Ernesto Signorelli,
BY Ivan P. Tashof,
Attorney

Nov. 26, 1957 S. E. SIGNORELLI 2,814,208
SPEED CONTROLLING AND COMPENSATING
DEVICES FOR ELECTRIC MOTORS
Filed Aug. 12, 1953 2 Sheets-Sheet 2

INVENTOR.
Salvador Ernesto Signorelli,
BY Juan P. Tashof,
attorney

United States Patent Office 2,814,208
Patented Nov. 26, 1957

2,814,208

SPEED CONTROLLING AND COMPENSATING DEVICES FOR ELECTRIC MOTORS

Salvador Ernesto Signorelli, Buenos Aires, Argentina

Application August 12, 1953, Serial No. 373,871

9 Claims. (Cl. 74—472)

This invention relates to a speed controlling and compensating device for electric motors and more particularly it refers to a controlling and compensating device for electric motors for gramophones and the like, in which the driving shaft is in transmission relationship with at least one speed transmitting pulley which in its turn is in frictional engagement with the inner edge of the turntable, so that the rotary movement produced by said electric motor is transmitted to said turntable through said speed transmitting pulley.

In this type of driving motor arrangements, an outstanding drawback resides in the fact that the construction must be accurate enough so as to be able to transmit a constant speed which is specially necessary when long-play records are used, in order to obtain a good acoustic reproduction.

Bearing in mind that some parts of the country are not yet fully electrified and that in said parts the voltage of the electric current often varies, it is necessary to provide means for compensating the voltage variations in order to maintain the number of revolutions of the turntable constant.

Another reason for providing the speed controlling and compensating device is to be able to compensate an eventual inaccuracy in structure as far as the speed transmission elements are concerned.

In view of the above, a speed controlling and compensating device for electric motors, particularly for gramophones has been conceived, of the type comprising a frame, a stationary field-magnet, a rotor provided with a driving pulley, said rotor being at least partially housed in said stationary field-magnet, and at least one transmission pulley in transmitting relationship with said driving pulley, in which at least one of said pulleys is a tapered pulley and one of said pulleys is capable of sliding parallel to the longitudinal axis of the other pulley.

It is an object of the present invention to provide a peripheral speed controlling device for an electric motor in order to compensate the voltage variations of the electric supply current.

Another object is to provide a speed controlling device of the type mentioned, having means for compensating the diametric wear of the pulleys.

Still another object is to provide a speed controlling device in accordance with the present invention so conceived and constructed as to minimize the structural accuracy coefficient according to which the electric motor has to be built.

A further object is to provide a peripheral speed controlling and compensating device by means of which it is possible to vary the number of revolutions of the turntable in accordance with the requirements.

A still further object is to provide an electric motor having a speed controlling device for compensating the braking effect of the lubricating oil when at low temperatures, where the viscosity of said oil increases.

Another object is to provide additional means for changing the value of the field-magnet in case the voltage of the electric supply current varies substantially.

These and further objects and advantages of the present invention will become more apparent during the course of the following description in which, by way of example, several embodiments are shown.

Although the preferred use of the speed controlling and compensating device of the present invention is for gramophones, it is obvious that said device may be used in connection with electric motors for other purposes.

Figure 1:
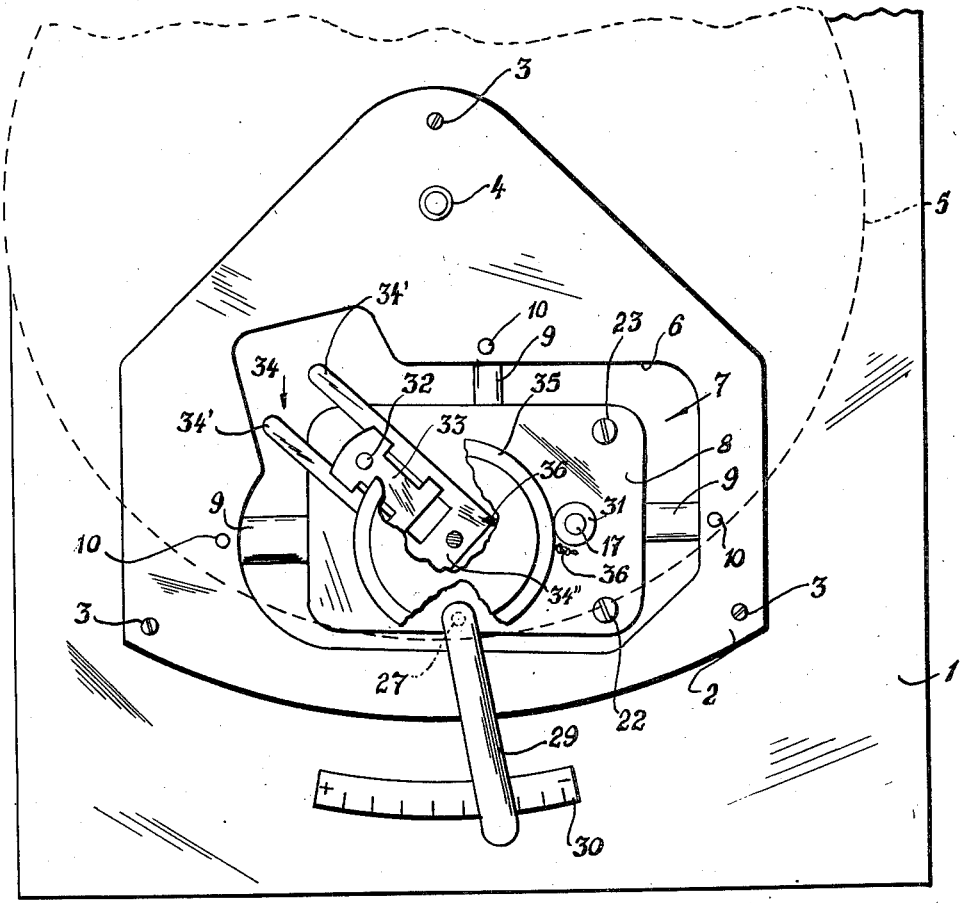
Figure 1 is a plan view of an electric motor mounted in a gramophone casing provided with a peripheral speed controlling device according to a preferred embodiment of the present invention and wherein the turntable has been shown in dotted lines.

In Figure 1 a gramophone casing 1 has been shown, which supports a platform 2 by means of a plurality of screws 3 having elastic washers (not shown). This platform 2 is provided with a vertical, rotary stub shaft 4 which supports the turntable 5.

Platform 2 comprises a large opening 6 in which the electric motor 7 is partially housed and which electric motor comprises a supporting plate 8 having for instance three supporting ears 9 linked to the platform 2 by means of corresponding screws 10 and elastic washers 11 (see Figure 2) in order to support the electric motor 7, as is already well known in the art.

The electric motor 7 mainly comprises a stationary field-magnet 12 (see Figure 2) provided with a coil 13 having the conductors 14 and 15 by means of which said electric motor is connected to the electric supply current source and further comprises a rotor 16 rotatably mounted in said field-magnet 12, as is also known in the art.

Figure 3:
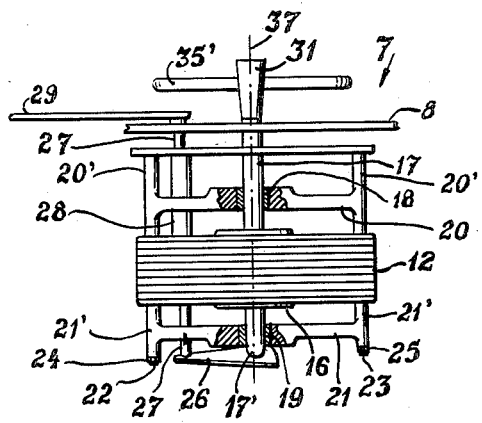
Figure 3 is a side elevation, in which similarly as in Figure 2, some parts have been omitted.

The rotor 16 comprises a driving shaft 17 rotatably supported by upper bearing 18 and lower bearing 19 (see Figure 3). These bearings 18 and 19 are arranged in H-shaped bearing supports 20 and 21, respectively, having columns 20' and 21' which are coaxial and through which pass screws 22 and 23, respectively (see Figures 1 and 3), which screws also pass through the field-magnet 12. The screw heads are supported by supporting plate 8 (see Figure 1) and their opposite free ends project out of the columns 21' where corresponding nuts 24 and 25 fasten the assembly so as to form a rigid unit.

The lower end 17' (see Figures 2 and 3) of the driving shaft 17 acts as a vertical pivot and is supported by an inclined plate 26 with regard to the horizontal plane, which plate 26 is connected to or integral with a control shaft 27 which passes through the field-magnet 12 and the lower face of the supporting plate 8. The upper end of said control shaft 27 projects out of said bearing 28 and is provided with a control lever 29 projecting out of the platform 2 and is preferably linked to a position immobilizing means such as plate 30 mounted on casing 1.

The upper end of the driving shaft 17 is provided with a tapered and more particularly with a frusto-conical pulley 31 although it is obvious that the same shaft could be of conical or frusto-conical shape.

Figure 2:
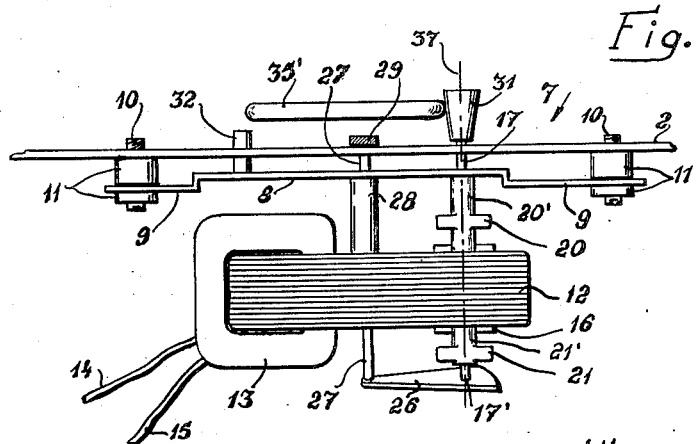
Figure 2 is a front elevation of the electric motor of Figure 1, partially in section, in which in order to not overburden the drawing, the supporting device of the transmission pulley and the turntable have not been shown.

The supporting plate 8 comprises in the embodiment shown in Figures 1 to 3 a stationary pivot 32 (see Figures 1 and 2) on which a double T-shaped guide 33 is swingably mounted, the wings of which have slots in which the branches 34' of a fork 34 are slidably mounted. Said fork 34 has a base 34" rotatably supporting a transmission pulley 35, the peripheral edge 35' of which is usually a rubber band which is in frictional engagement with the frusto-conical pulley 31 which is the driving pulley.

A spring 36 links a stationary point of the supporting plate 8 with the base 34" of the fork 34 and always tends to maintain the frictional transmitting engagement between the transmission pulley 35 and the driving pulley 31 and also maintains the frictional engagement between the transmission pulley 35 and the internal edge of the turntable 5.

The operation of the electric motor is the same as in similar known motors, or in other words upon supplying electric current through conductors 14 and 15 the rotor 16 starts to rotate and together with it the shaft 17 and the driving pulley 31 which latter transmits the movement through the transmission pulley 35 to the turntable 5.

If the number of revolutions is not the correct one, due to any of the above stated reasons for instance, it is sufficient to change the position of the control lever 29, whereby the control shaft 27 will rotate and thus the inclined plate 26 will vary its position with regard to the lower end 17' of the driving shaft 17 which is displaced along its axis 37 (see Figure 2 or 3), whereby the periphery 35' of the transmission pulley 35 will enter in contact with another portion of the frusto-conical driving pulley 31 and thus the number of revolutions of the turntable 5 will be varied. Spring 36 of the T-shaped guide 33 will maintain the fork 34 in the correct position so that the transmission pulley 35 will maintain its frictional engagement with the driving pulley 31 and the turntable 5.

Although the foregoing description is considered as sufficient so as to enable anybody to understand the peripheral speed controlling device of the present invention, in order to show that it is intended to cover a new basic idea of application and not only a single structural embodiment, several other embodiments will now be explained.

Figure 4:
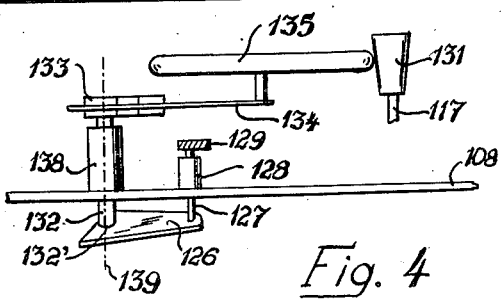
Figure 4 is a schematical side elevation of the essential parts of another structural embodiment of the peripheral speed controlling device, in accordance with the present invention.

Thus, in Figure 4, wherein only the pertinent parts have been shown, a device is illustrated in which the double T-shaped guide 133 of the transmission pulley 135 is vertically displaceable with regard to the driving pulley 131 mounted on a driving shaft 117 which is not able to slide along its longitudinal axis. In this event the supporting plate 108 is provided with a bushing 138 slidably supporting a shaft 132 along its axis 139 and the upper end of which is linked to the double T-shaped guide 133 which slidably supports the fork 134 provided with said transmission pulley 135.

Similarly as in the embodiment shown in Figures 1 to 3, the instant embodiment also comprises a control lever 129 linked to the control shaft 127 rotatably supported by a bushing 128 mounted on the supporting plate 108. This control shaft 127 supports at its lower end an inclined plate 126, with regard to the horizontal plane on which rests the lower end 132' of shaft 132.

Upon operating the control lever 129, the height of the transmission pulley 135, with regard to the driving pulley 131 is varied and thereby the desired speed variations are obtained.

Figure 5:
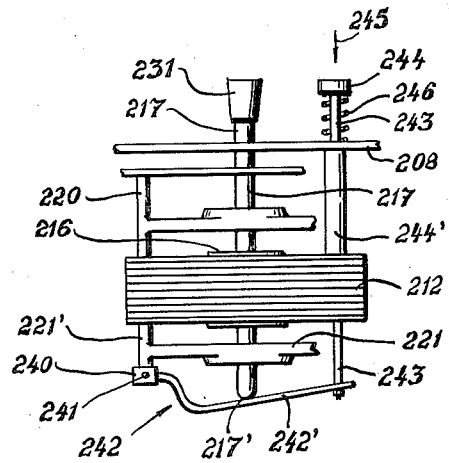
Figure 5 is another schematical side elevation, partially in section, of still another embodiment of the invention.

In the embodiment shown in Figure 5, another arrangement for the slidable shaft has been proposed. This embodiment comprises a supporting plate 208, a stationary field-magnet 212, a rotor 216 partially housed in said stationary field-magnet 212 and provided with the driving shaft 217 having a lower end 217'. The driving shaft 217 is arranged in an upper H-shaped support 220 and a lower H-shaped support 221 having one column 221' provided at its lower end with a fork 240 comprising a pin 241 swingably supporting a lever 242 comprising an inclined arm 242' with regard to the horizontal plane, on which rests the lower end 217' of the driving shaft 217 the upper end of which is provided with a frusto-conical driving pulley 231.

The free end of the lever 242 is linked to a control shaft 243 passing through the field-magnet 212 and a vertical guide bearing 244' is arranged between the upper face of the field-magnet 212 and the lower face of the supporting plate 208. The free end of said control shaft 243 emerges out of said supporting plate 208 and comprises a push-button 244 which may be pressed down in the direction indicated by arrow 245. A compression spring 246 located between the lower face of the button 244 and the upper face of the supporting plate 208 tends to maintain said button 244 and therewith the shaft 243 and the lever 242 in the uppermost position. Upon pressing down the push button 244 in the direction shown by arrow 245, the driving shaft 217 is lowered and thereby the frusto-conical driving pulley changes its position. The push button 244 is connected to a control mechanism (not shown).

Figure 6:
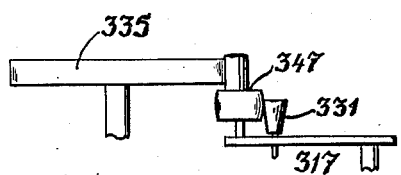
Figure 6 is a schematical side elevation showing the present invention applied to a three speed motor.
Figure 7:
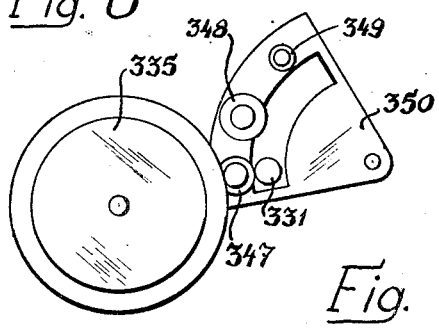
Figure 7 is a schematical plan view of the device shown in Figure 6.

If it is desired to apply the device of the present invention to a turntable for several speeds, the driving pulley 331 (see Figures 6 and 7), mounted on its driving shaft 317, engages one of a plurality of intermediate transmission pulleys 347, 348 or 349 mounted on a swingable platform 350 as is already known in the art. These intermediate pulleys 347 to 349 comprise two diametrically different peripheral portions with one of which the driving pulley 331 enters in contact whilst the other is connected to the transmission pulley 335.

Figure 8:
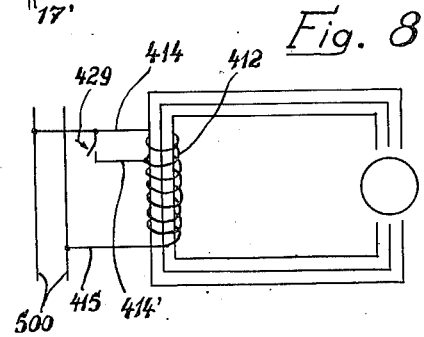
Figure 8 is an electric diagram of still another embodiment of the present invention in which the speed controlling device is also a compensating device for compensating voltage variations of the electric supply current.
Figure 9:
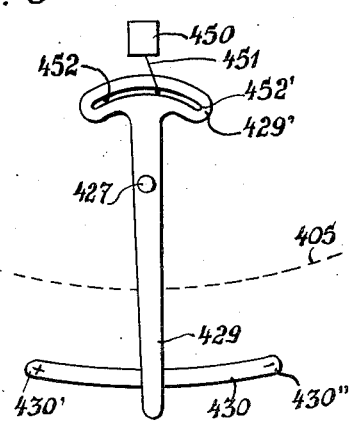
Figure 9 is a schematical plan view of a structural embodiment of the principle shown in Figure 8.

If the voltage variation of the electric supply current should be considerable, the peripheral speed controlling and compensating device may be further provided with a shunting device so as to vary the capacity of the field-magnet. To this end, as schematically shown in Figure 8, the field-magnet 412 comprises besides the conductors 414 and 415 connected to a supply current source 500, a shunt 414' connected to the conductor 414 by means of a switch 450 operated by the control lever 429 as better shown in Figure 9, wherein the turntable 405 and the plate 430 have also been shown. The manually operated control lever 429 operates the control shaft 427 and further comprises for instance a slotted annular sector 429' to which the operating lever 451 of the switch 450 is connected.

In operation when for instance the lever 429 reaches the left end position 430' and the speed of the turntable 405 is still not the one required because the voltage is too low, upon further shifting the control lever 429 in a small extent towards the left, the operating lever 451 of switch 450 is operated by the right end 452' of the slot 452 and thus the switch 450 is closed and the field-magnet 412 is shunted and then the lever 429 must again be returned to the right end 430" to start again the adjustment of the speed of the turntable but starting with a higher initial speed.

A similar adjustment can be made by operating in the inversed sense in order to open the switch 450 and thereby decrease the speed of the turntable 405.

I claim:

1. A speed controlling and compensating device for electric motors, particularly for gramophones and the like of the type comprising a stationary field-magnet, a rotor at least partially housed in said stationary field-magnet and comprising a driving pulley, at least one transmission pulley in transmitting relationship with said driving pulley, wherein one of said pulleys is a tapered pulley and one of said pulleys is displaceable with regard to the other pulley so as to vary the distance between the axes of said pulleys and thereby varying the transmission relationship between said pulleys, a control mechanism for controlling said pulley which is displaceable, said control mechanism including a manually operated control lever, a control shaft having a first end and a second end, said control lever being connected to said first end of said control shaft, a plate inclined with respect to the horizontal plane and connected to said second end of said control shaft, said rotor comprising a driving shaft having an upper end and a lower end, said driving pulley being mounted on said upper end, said lower end resting on said inclined plate.

2. A speed controlling and compensating device for electric motors of the type comprising a stationary field-magnet, a rotor at least partially housed in said stationary field-magnet and comprising a driving pulley, at least one transmission pulley in transmitting relationship with said driving pulley, wherein at least one of said pulleys is a tapered pulley and said transmission pulley is capable of sliding parallel to the longitudinal axis of the other pulley, a control mechanism for controlling the sliding of said transmission pulley, said control mechanism including a manually operated control lever, a control shaft having a first end and a second end, said control lever being connected to said first end of said control shaft, a plate inclined with respect to the horizontal plane and connected to said second end of said control shaft, said transmission pulley being mounted on a shaft having a free end resting on said inclined plate.

3. A speed controlling and compensating device as claimed in claim 2, wherein said control shaft is adapted to rotate about its longitudinal axis.

4. A speed controlling and compensating device as claimed in claim 2, wherein said control shaft is adapted to slide along its longitudinal axis.

5. In combination, a casing, a platform supported by said casing, a vertically disposed stub shaft extending from said platform, a turntable supported by said stub shaft, there being an opening in said platform, an electric motor projecting through the opening in said platform and including a supporting plate having a plurality of spaced ears secured to said platform, said motor comprising a stationary field magnet provided with a coil having conductors connected thereto, a rotor rotatably mounted in said field magnet and including a driving shaft, bearings for rotatably supporting said driving shaft, the lower end of said driving shaft defining a pivot, an inclined plate arranged in engagement with the lower end of said shaft, a control shaft extending through said field magnet and connected to said inclined plate, a lever extending from said control shaft, and a pulley on the upper end of said driving shaft.

6. In combination, a casing, a platform supported by said casing, a vertically disposed stub shaft extending from said platform, a turntable supported by said stub shaft, there being an opening in said platform, an electric motor projecting through the opening in said platform and including a supporting plate having a plurality of spaced ears secured to said platform, said motor comprising a stationary field magnet provided with a coil having conductors connected thereto, a rotor rotatably mounted in said field magnet and including a driving shaft, bearings for rotatably supporting said driving shaft, the lower end of said driving shaft defining a pivot, an inclined plate arranged in engagement with the lower end of said shaft, a control shaft extending through said field magnet and connected to said inclined plate, a lever extending from said control shaft, and a pulley on the upper end of said driving shaft, said supporting plate including a stationary pivot, a guide swingably mounted on said last named pivot, a fork slidably connected to said guide and including a base, and a transmission pulley rotatably supported on said base and arranged in engagement with said first named pulley.

7. In a speed controlling and compensating device for electric motors, particularly for gramophones and the like, a stationary field magnet, a rotor at least partially housed in said stationary field magnet and comprising a driving pulley, at least one transmission pulley in transmission relationship with said driving pulley, one of said pulleys being a conical pulley, lever operated control means for sliding one of said pulleys parallel to the axis of the other pulley in order to vary the transmission relationship, said control means including a switch for controlling a field shunt connected to said stationary field magnet, said lever operated control means having a first end position corresponding to one end position of said conical pulley, and a second end position corresponding to the other end position of said conical pulley, said lever operated control means being adapted to operate said switch when reaching either of said first and second end positions, so that upon operating said switch a new pulley adjustment transmission relationship within another range may be carried out.

8. In a speed controlling and compensating device for electric motors, particularly for gramophones and the like, a stationary field magnet, a rotor at least partially housed in said stationary field magnet and comprising a driving pulley, at least one transmission pulley in transmission relationship with said driving pulley, one of said pulleys being a frusto-conical pulley and one of said pulleys being capable of parallel sliding to the longitudinal axis of the other pulley, a control mechanism for controlling the sliding of said other pulley up to either of two end positions, a switch controlled shunt for said field magnet, said switch controlled shunt being operated by said control mechanism when said control mechanism has reached either of said two end positions to thereby have another range of transmission relationship.

9. A speed controlling and compensating device for electric motors particularly for gramophones and the like of the type comprising a stationary field magnet having a field shunt, a rotor at least partially housed in said stationary field magnet and comprising a driving pulley, at least one transmission pulley in transmission relationship with said driving pulley, wherein one of said pulleys is a tapered pulley and one of said pulleys is displaceable with respect to the other pulley so as to vary the distance between the axes of said pulleys and thereby varying the transmission relationship between said pulleys, a control mechanism for controlling said pulley which is displaceable, said control mechanism including a manually operated control lever having a first end position and a second end position, a rotatable control shaft having a first end and a second end, said control lever being connected to said first end of said control shaft for rotating said control shaft, a plate inclined with respect to the horizontal plane and connected to said second end of said control shaft, said rotor comprising a driving shaft having an upper end and a lower end, said driving pulley being mounted on said upper end, said lower end resting on said inclined plate, a switch for controlling said field shunt operable by said control lever when in either of said first and second end position to vary the speed supplied by said rotor and to thereby provide a new range of transmission relationship.

References Cited in the file of this patent

UNITED STATES PATENTS

| | | |
|---|---|---|
| 2,254,844 | Guedon | Sept. 2, 1941 |
| 2,281,665 | Brady | May 5, 1942 |
| 2,381,079 | Pittman | Aug. 7, 1945 |
| 2,439,026 | Schneider | Apr. 6, 1948 |